United States Patent [19]
Wright

[11] 3,855,920
[45] Dec. 24, 1974

[54] ADJUSTABLE SAFETY DIE BLOCK-RADIAL LOBE DESIGN

[75] Inventor: James T. Wright, Grosse Pointe Shores, Mich.

[73] Assignee: Carlson-Dimond & Wright, Inc., Warren, Mich.

[22] Filed: Nov. 2, 1973

[21] Appl. No.: 412,102

[52] U.S. Cl. ................ 100/53, 192/131 R, 425/153
[51] Int. Cl. ............................................. B30b 15/08
[58] Field of Search ........... 100/53; 192/116.5, 129, 192/130, 131 R; 248/351, 354 R; 83/526, 545, DIG. 1; 425/151, 153, DIG. 45

[56] References Cited
UNITED STATES PATENTS

| | | | |
|---|---|---|---|
| 2,240,630 | 5/1941 | Stacy | 192/131 R |
| 2,946,277 | 7/1960 | Archer | 100/53 |
| 2,990,578 | 7/1961 | Adair et al. | 100/53 X |
| 3,023,457 | 3/1962 | Sunday | 425/DIG. 45 |
| 3,541,950 | 11/1970 | Anderson | 100/53 |
| 3,650,650 | 3/1972 | Cook | 425/153 |
| 3,735,842 | 5/1973 | Spanke | 248/354 R X |

FOREIGN PATENTS OR APPLICATIONS

| | | | |
|---|---|---|---|
| 1,232,693 | 10/1960 | France | 100/53 |
| 1,100,940 | 3/1961 | Germany | 425/151 |

Primary Examiner—Billy J. Wilhite

[57] ABSTRACT

A safety die block of metal, suitable plastic materials of high compression values, or combinations of the two, of radial lobe design, is made of segmental layers having a common central axis of rotation, arranged one directly upon another or in partially nested offset relationship upon their common axis, whereby the segmental layers can be compactly reorganized and secured together into a die block of lesser height from one of a greater height. Each segmental layer has a plurality of radial lobes with alternating intermediate open spaces therebetween whereby when an adjacent layer is compactly arranged with a first segmental layer, the latter's lobes seat within the open spaces between the lobes of the first segmental layer. The segmental lobes are arranged with radial grooves on their bottom surfaces and radial ribs on their top surfaces, in register with the grooves, for locating and holding the segmental layers in direct alignment and register with each other when a load has been applied to the stack of layers. When adjacent segmental layers are offset into compact relationship, the one layer out of register with or offset with respect to its adjacent layer is disposed between two directly aligned layers. The web portion of the segmental layers has a thickness such that no load is carried by the offset segmental layer when it is at rest upon the web portion of the segmental layer next therebelow and the die block is in compression.

28 Claims, 18 Drawing Figures

PATENTED DEC 24 1974

ADJUSTABLE SAFETY DIE BLOCK-RADIAL LOBE DESIGN

The invention pertains to and involves the construction of an adjustable safety die block designed for use in the open area of vertical or horizontal presses between the die bed or die plate and the upper movable plate or platen of the press, to provide a member therebetween which will prevent inadvertent or accidental lowering of the platen or upper die section toward the die bed with consequent damage to tools and dies, to the press, or to personnel having their hands or other body portions in the region between the platen and the die bed. The use of safety die blocks made of metal for this purpose has long been known and practiced in the press art. These safety die blocks are usually made of a relatively light weight metal such as magnesium, aluminum, or special light weight alloys of magnesium and/or aluminum or other metals. The safety die blocks generally range in size from about 4, 5 or 6 inches to as much as 12, 18, 24 or more inches in length, standard lengths generally falling into the range of 12 to 24 inches. The safety die blocks are generally used and usually required when tooling in the press is to be inserted, changed, modified or corrected. Safety precautions call for shutting off the electrical power to the press to prevent its accidental or inadvertent operation, the insertion of the safety die block between the platen and the die bed on which the die block rests, and careful removal and insertion of tooling from and into the die holders.

A principal difficulty in connection with safety die blocks heretofore and currently available has been the requirement for carrying a substantial number of die blocks, each one of a specific length to accommodate a wide number of openings in the presses. It has been found that many of these members, which serve no other useful press purpose, are generally subject to abuse, being mislaid, and severance into reduced lengths when press maintenance personnel cannot locate a safety die block of the then-desired length. The result is that when a maintenance man is looking for a safety die block, he usually experiences some difficulty in locating one of the particular length that he then requires. It is not surprising, therefore, that safety die blocks are generally abused. Press departments, particularly where large numbers of presses are in operation, usually lack for light weight safety die blocks. The need therefore is for a safety die block that is adjustable. It will, of course, be recognized by persons skilled in the art to which the invention pertains that adjustability has no particular significance if in adjustment, compressive load requirements cannot be met. The safety die block of this invention provides means for supporting compressive loads when the die block is either in full length alignment or in adjusted or shortened lengths.

BRIEF DESCRIPTION OF THE INVENTION

The adjustable safety die block of this invention comprises a plurality of stacked segmental layers or members having a number of radial lobes. Although four lobes are here shown and described for these members, a different number of lobes such as two, three, five or six, or more, can also be utilized by the same principle in the construction of an adjustable die block.

The plurality of stacked segmental layers have their radial lobes extending from a spider-type central web portion of reduced thickness, the web portion having an axial bore therethrough adapted to receive and pass a center locking tube and screw assembly for maintaining the segmental layers in extended or compacted alignment. Aligning features such as complementary radial grooves and ribs are used, or the lobes can have complementary radial convex upper and concave lower surfaces, so that the lobes will make substantially complete surface load-bearing contact throughout.

When each segmental layer is in fully aligned relationship with every other segmental layer of the die block, it attains its maximum extended length. When some segmental layers are rotated into offset nesting compact relationship with adjacent segmental layers, the safety die block is adjusted to a reduced length. The telescoping center screw and tube assembly is threadedly adjustable to secure the segmental layers in their fully aligned extended or compacted relationships.

The die block segmental layers of this invention can be made of a variety of metals, preferably those which are of light weight and high compressive strength, among which can be light weight magnesium alloys, light weight aluminum alloys, and other similar materials, as well as of some plastic materials including nylon plastic reinforced with short glass fibers (such as Du Pont's Zytel materials), and other equivalent plastic materials having substantially high compressive strength and light weight.

It is therefore an object of the invention to provide an adjustable safety die block in the form of a plurality of segmental layers which can be secured together axially in a fully extended aligned attitude of maximum length, while capable of being reduced in length by rearranging the segmental layers so as to nest and compact with next adjacent layers. A further object is to provide safety die block segmental layers having radially extending lobes and intermediate sapces therebetween of a dimension such that lobes of next adjacent segmental layers can locate and lie therein. A further object is to provide segmental layers which can be made of light weight metal or plastic materials. Still another object is to provide segmental layers having complementary features effecting alignment registration of their lobes with lobes of next adjacent layers. Yet a further object is to provide an adjustable safety die block composed of a plurality of discrete stackable segmental layers which can be molded or cast of relatively light weight metallic or plastic materials, economically feasible and competitive, and practical for use as a piece of safety die block equipment for presses.

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which FIG. 1 is a fragmentary perspective view of the die bed and upper movable platen of a press, illustrating a preferred embodiment of the invention disposed upon a die bed under the platen of the press.

Figure 13:
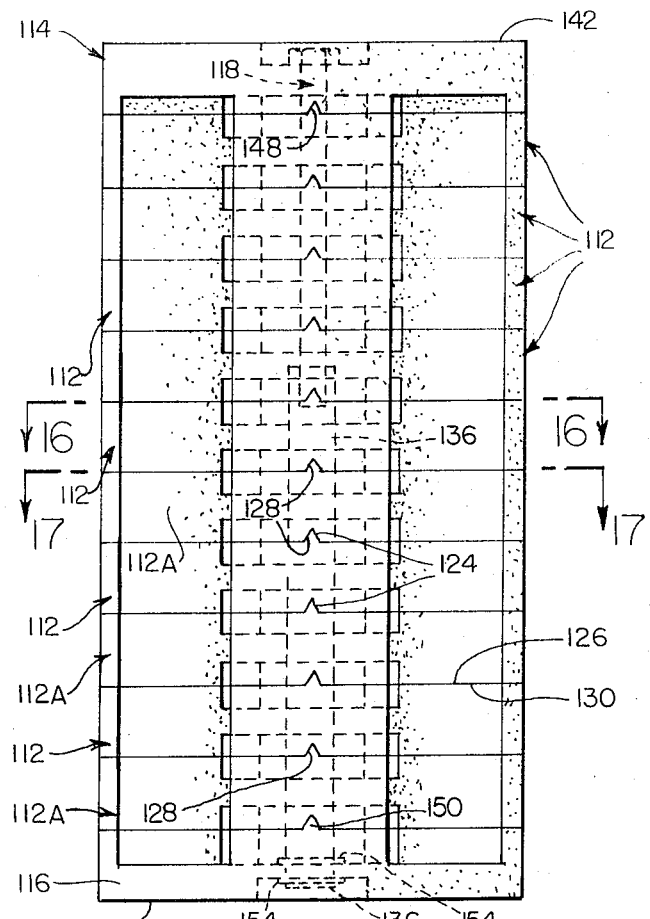
FIG. 13 is an elevational view of the adjustable safety die block illustrated in FIG. 12.
Figure 16:
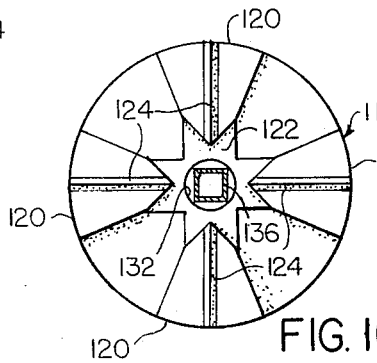
Figure 17:
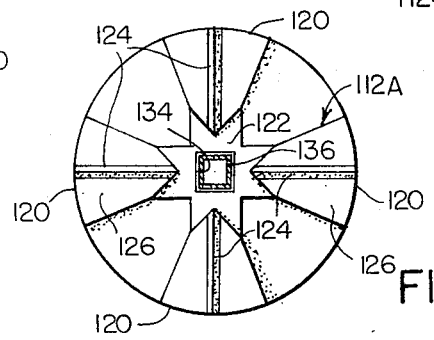

FIGS. 16 and 17 are horizontal sectional views taken on the lines 16—16 and 17—17 respectively of FIG. 13.

Figure 12:
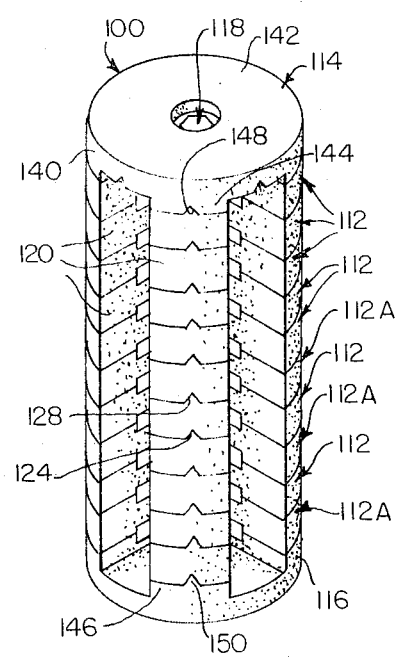
FIG. 12 is a perspective view of a slightly modified embodiment of the adjustable safety die block illustrated in FIG. 1.
Figure 18:
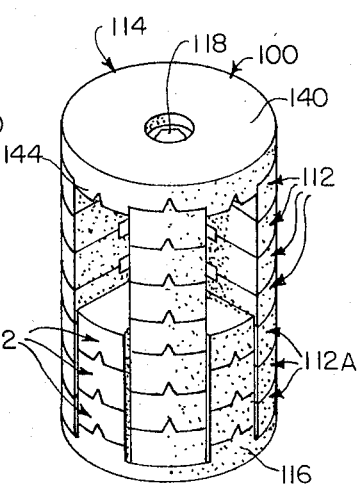

FIG. 18 is a perspective view similar to that illustrated in FIG. 12 of the modified form adjustable safety die block in which some of the segmental layers have been re-arranged into offset nested position, reducing the overall height of the die block.

As illustrated in the several views of the drawings and particularly in FIGS. 1–8 inclusive, the adjustable safety die block 10 comprises a plurality of segmental layers 12 arranged in aligned relationship one above the other and secured together by the screw tube assembly 14 in either their aligned (FIG. 2) or their fully compacted (FIG. 6) relationships, or any intermediate compacted relationship produced by rotating one or more of the segmental layers 12 into nested relationship with next adjacent layers.

Figure 3:
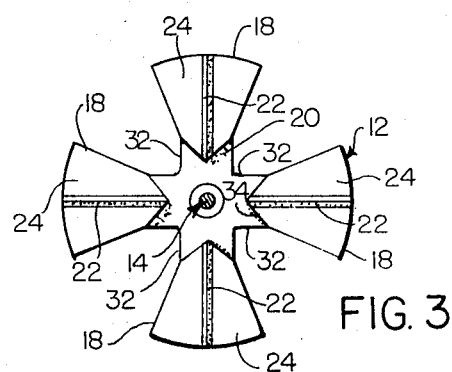
FIG. 3 is a plan view of a segmental layer, taken substantially on the line 3—3 of FIG. 2.
Figure 4:
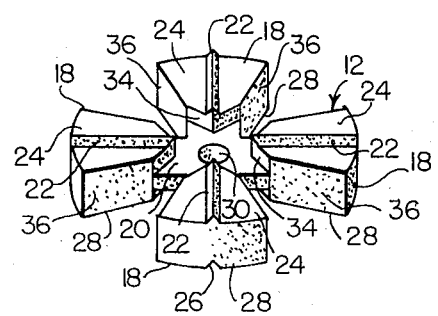
FIG. 4 is a perspective view of the die block segmental layer illustrated in FIG. 3.

As illustrated particularly in FIGS. 3 and 4, the die block segmental layers 12 each comprises a plurality of lobes 18 which extend radially outwardly from the axial spiderlike web section or portion 20, tapering from a minor width at the web portion 20 to a major width adjacent the outer peripheral edge of the lobe. In order to provide means for maintaining alignment of the lobes 18 with respect to the lobes of next adjacent segmental layers 12, radial ribs 22 are provided on the upper surface 24 of each of the lobes 18 and radial grooves 26, complementary with the ribs 22, on the lower or bottom surface 28 of the lobes 18. The integrally formed axial spider web portion 20 of the segmental layers 12, of reduced thickness, lies substantially central and medially between the upper and lower surfaces 24 and 28 of the lobes 18. The thickness of the web portion 20 is preferably less than one-half the vertical height of the lobes 18. An opening 30 is provided central and axially of the web 20, and is adapted to closely receive the screw and tube assembly 14. The axial web 20 is provided at its outer peripheral edge intermediate the lobes 18 with V-shaped notches 32 in the spaces intermediate the lobes 18 to provide recesses for passing and receiving the upper and lower inner radial V-shaped ends 34 of the lobes 18.

Figure 5:
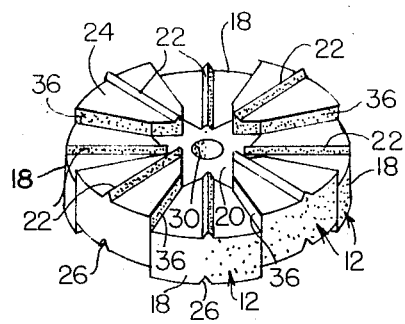
FIG. 5 is a perspective view of two segmental layers arranged in nested or compacted relationship.
Figure 7:
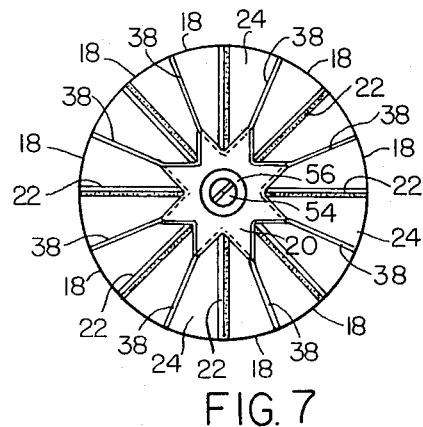
FIG. 7 is a horizontal sectional view taken substantially on the line 7—7 of FIG. 6.
Figure 6:
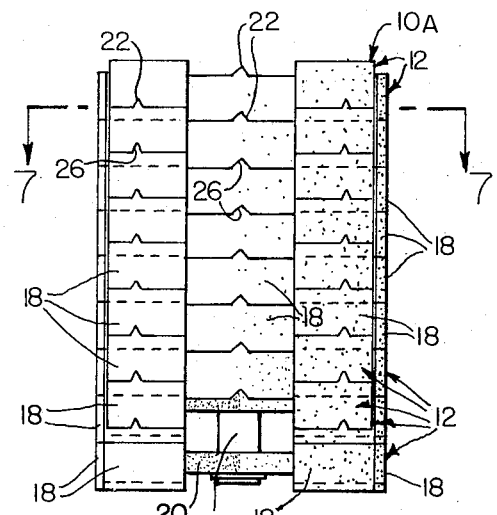
FIG. 6 is a front elevational view, similar to that illustrated in FIG. 2, showing the die block of FIG. 2 reduced to fully compacted height, by offset nesting of alternate segmental layers.

Each lobe 18 is provided with side walls or faces 36, 36, and a V-shaped notch 32 intermediate adjacent lobes defines an open space therebetween adapted to receive the lobes 18 of the segmental layers 12 positioned therein for nesting compacting arrangement of two adjacent segmental layers, as illustrated in FIGS. 5, 6 and 7. The tapering width of the lobes 18 is slightly less than the tapering width of the open space between opposing faces 36, 36 of adjacent lobes of each segmental layer 12. Thus, as seen in FIG. 7, the lobes of one segmental layer 12 are spaced slightly apart, at 38, from the adjacent lobes of the next adjacent nesting compacted segmental layer 12.

Figure 2:
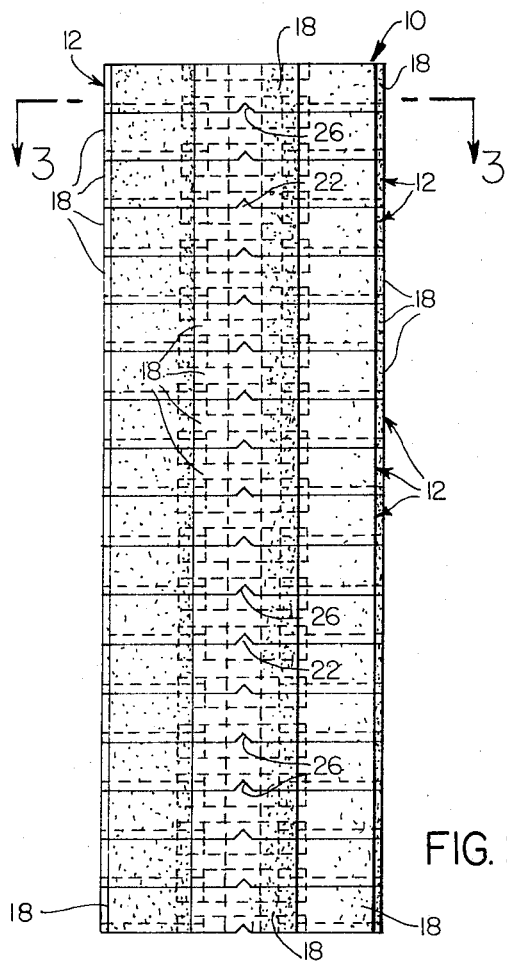
FIG. 2 is a front elevational view of the adjustable safety die block illustrated in FIG. 1.

It will be noted in the FIG. 2 and FIG. 6 illustrations that the topmost segment 12 has its radial upstanding ribs 22 removed from the lobes 18 in each instance, to provide a flat planar surface at the top of the stack of segmental layers 12 when arranged in either fully extended, aligned, one-on-one relationship, or in some alternatively compacted relationship of reduced height, as in FIG. 6. The bottom of the stack is substantially planar except for the radial grooves 26.

Figure 8:
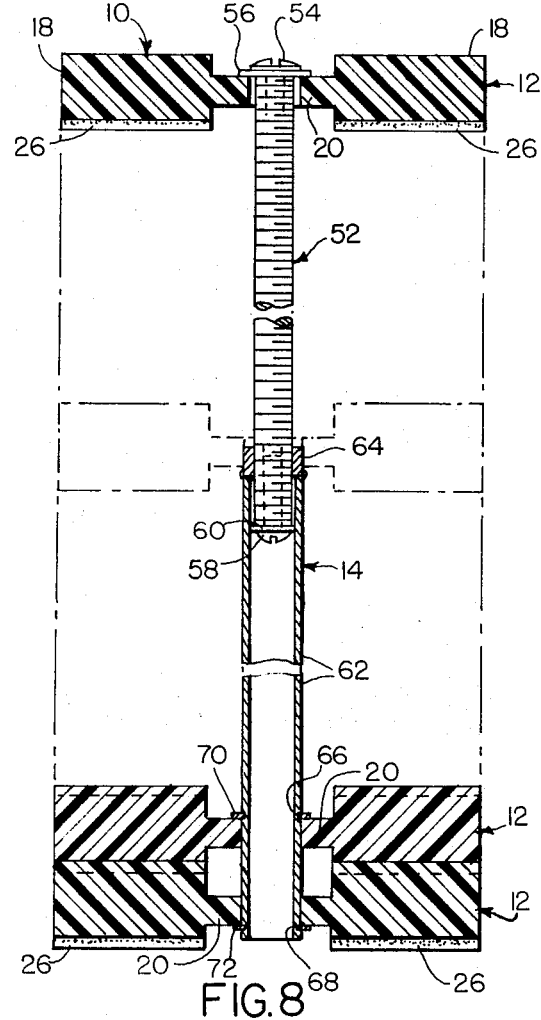
FIG. 8 is a vertical sectional view taken axially of the safety die block illustrated in FIG. 2, showing the telescoping screw and tube assembly in relationship to the segmental layers.

The segmental layers 12 are secured together by the threaded screw and telescoping tube assembly 14, more clearly illustrated in FIG. 8. The screw and tube assembly 14 comprises the externally threaded rod 52 fitted with a screw 54 and washer 56 at its uppermost end and a screw 58 and washer 60 at its lowermost end, and the tube 62 having an internally threaded adapter 64 secured thereto at its upper end for threadedly engaging the rod 52. The washer 60 affixed to the lower end of the rod 52 has a diameter less than the internal diameter of the tube 62 but greater than the internal threaded diameter of the adapter 64 so that as rod 52 is threaded outwardly from the adapter, the washer 60 will ultimately engage the lower end of the adapter and prevent threaded disengagement of the rod therefrom. The lower end of the tube 62 is provided with axially spaced apart annular grooves 66, 68 in which are seated the arcuate C-rings 70, 72 respectively, upon the upper surface and the lower surface of the spider web portions 20, 20 of the two lowermost segmental layers 12, 12 of the stack illustrated in FIGS. 2 and 6, to fixedly secure these layers therebetween.

Thus, when adjacent segmental layers 12, 12 are arranged in aligned overlying relationship as in FIG. 2, the threaded rod 52 is substantially fully extended from the tube 62 as in FIG. 8, securing the lobes of each segmental layer 12 in aligned overlying relationship, with their radial ribs 22 in register with and seated in the overlying grooves 26 of segmental lobes immediately thereabove. To arrange the segmental layers 12 in a staggered relationship in order to compact the several segmental layers into a safety die block of reduced length, as in FIG. 6, the threaded rod 52 is first threadedly extended upwardly so as to relieve the topmost segmental layer and permit it to be lifted upwardly a distance sufficient to clear the radial ribs 22 of the segmental layer next therebelow, and thus allow the raising of the next lower segmental layer and its rotation into the staggered nested relationship shown in FIGS. 5 and 7.

As each segmental layer 12 is rotated into staggered relationship with the next adjacent segmental layer so that the lobes 18 of the rotated layer slip into the spaces between the lobes of the next adjacent layer and the web portion 20 of the staggered layer rests upon the web portion of the next adjacent layer, the over-all height of the stack of segmental layers is reduced, and rod 52 is threadedly advanced at the adapter 64 into the tube 62 until washer 56 at the upper or distal end of the rod seats upon the web portion 20 of the topmost segmental layer 12.

Figure 9:
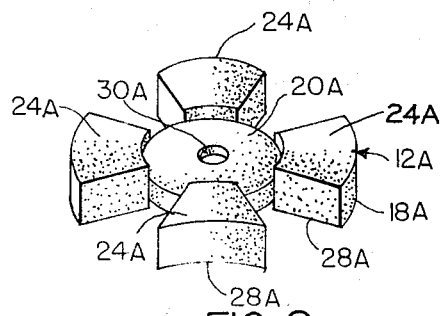
FIG. 9 is a perspective view of a segmental layer embodying a second preferred form.
Figure 10:
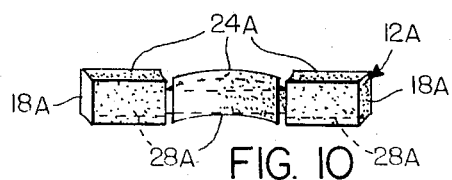
FIG. 10 is an elevational view of the segmental layer illustrated in FIG. 9.
Figure 11:
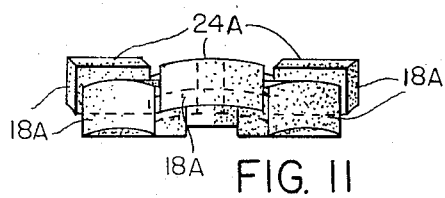
FIG. 11 is an elevational view of two adjacent segmental layers of the form illustrated in FIGS. 9 and 10, arranged in offset nested compact relationship.

A slight modification of the segmental layer 12 is illustrated in FIGS. 9–11 inclusive, in which a modified segmental layer 12a comprises the lobes 18a, spaced 90° apart, which extend radially from the intermediate medial integrally connected central web portion 20a. The modification is designed as an alternative to the radial rib 22 and complementary recess 26 disposed in the top and bottom surfaces respectively of the lobes 18 in the segmental layer 12. In the lobes 18a, the upper surface 24a is crowned convexly and the lower surface 28a is curved concavely, transversely of the lobe. The medial web portion 20a is also provided with an axial opening 30a adapted to receive the telescoping screw and tube assembly 14, as in the earlier described segmental layer 12. The segmental layer 12a is also provided with spaced openings between lobes 18a which are adapted to receive lobes 18a of next adjacent staggered nested segmental layers 12a when arranged in the relationship illustrated substantially in FIG. 11. As in the case of the topmost layer 12 whose radial ribs 22 have been removed, the convexly crowned surface 24a of the topmost layer 12a is also removed so as to provide a planar surface to the platen 82 of the press.

The purpose and function of the upper convexly crowned lobe surfaces 24a and the lower concavely crowned surfaces 28a is to seat and maintain the lobes 18a in register when adjacent segmental layers are disposed in alignment one above the other. This configuration is substantially the equivalent of the rib and groove construction described above for the segmental layer 12.

Figure 1:
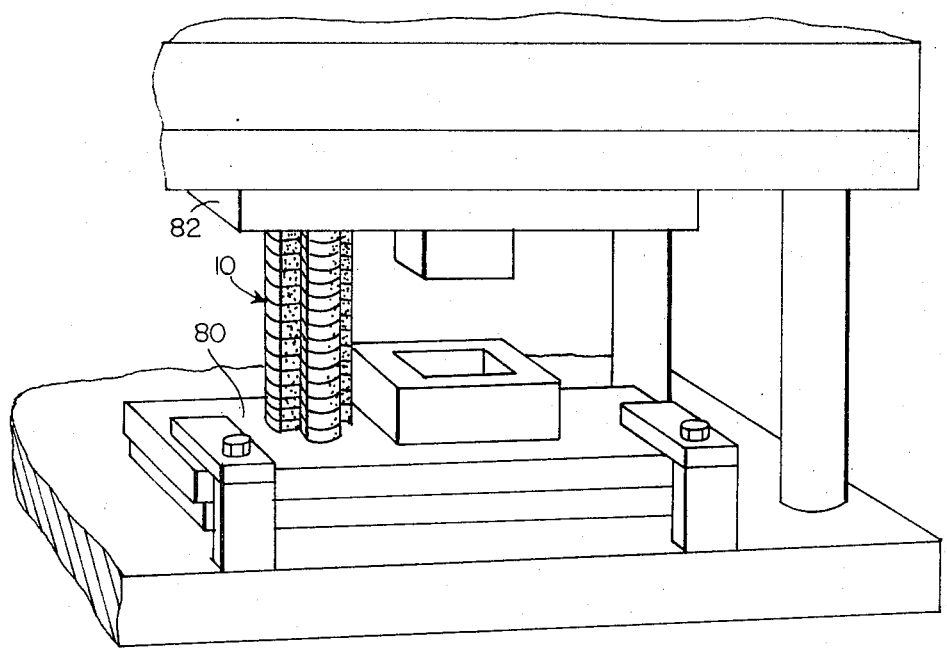

In operation, to obtain a full length or extension of the safety die block 10 by the segmental layers 12 or 12a, their lobes are disposed in alignment with the lobes of the next superior segmental layer until the full stack is formed, the threaded rod 52 then being advanced into the tube 62 until upper washer 56 seats firmly upon and secures the topmost segmental layer 12 or 12a firmly upon the aligned segmental layers therebelow and the stack is made substantially rigid. As illustrated in FIG. 1, the adjustable safety die block 10 is then placed upon the die bed 80 and under the platen 82, whereby the platen is prevented from being lowered into closer relationship with the die bed.

If a more compact adjustable safety die block of lesser length is desired, the rod 52 is threadedly advanced outwardly from the adapter 64 on tube 62 so that the uppermost or topmost segmental layer 12 or 12a can be raised and rotated into staggered relationship with the next adjacent segmental layer therebelow, the lobes 18 or 18a of the topmost layer being disposed in the spaces between the lobes 18 or 18a of the segmental layer next therebelow (FIG. 5). Greater compactness can be achieved by similar rotation of alternate segmental layers 12 or 12a until the segmental layer second from the bottom of the stack is reached. This penultimate layer is not rotatable because it is secured with the bottommost layer by arcuate rings 70, 72 against such rotation, to provide space for the distal end of screw 52 when fully engaged with tube 62. The lengths of the screw 52 and the tube 62 are of course selected to suit particular combinations of the segmental layers, which may be of any reasonable number depending upon the diameter of the layer and the compressive load which the stack is required to support. Another factor, of course, is the overall weight and size of the assembled stack 10, which should preferably be of the order that a press maintenance man can readily and easily handle.

It will therefore be recognized that the assembled stack 10 of segmental layers 12 can be arranged in a variety of lengths, and that each particular arrangement of aligned layers 12 carries the compressive load applied to the stack while the offset nested layers 12 carry no load. The same is also true for the stack of segmental layers 12a.

A slightly modified form of the adjustable safety die block 10 is illustrated in FIGS. 12–18 inclusive. In this modification, the full height adjustable safety die block 100 comprises a plurality of segmental layers 112 arranged in aligned relationship one above the other and capped at their upper and lower ends with a top plate 114 and a bottom plate 116. This stack of segmental layers and end plates is secured together by a screw assembly 118 in either the aligned fully extended stack illustrated in FIGS. 12 and 13, or in the more compact relationship illustrated in FIG. 18, or in any intermediate compacted relationship therebetween produced by rotating one or more of the segmental layers 112 into nested relationship with next adjacent layers, as will be more fully described hereinafter below.

The segmental layers 112 are substantially identical with the segmental layers 12 described above for the adjustable safety die block 10. Each segmental layer 112 comprises a plurality of lobes 120 which extend radially outwardly from the axial spider-like web section 122. As in the case of the axial web sections 20, the web section 122 is similarly of reduced thickness and substantially medial of the height of the segmental layer 112. To provide means for maintaining alignment of the lobes 120 with respect to the lobes of next adjacent segmental layers, radial ribs 124 are provided on the upper surfaces 126 of each of the lobes 120, and radial grooves 128, complementary and substantially in register with the ribs 124, on the lower or bottom surface 130 of the lobes 120. A round opening 132 is provided in the segmental layers 112 central and axially of the web 122, to closely encircle the screw and tube assembly 118, in most of the segmental layers 112. However, as will be noted in FIG. 17, a square axial opening 134 central of the web section 122 is provided in the segmental layers 112a to conform relatively closely to the square tube 136 which forms the lower portion of the screw and tube assembly 118. The round opening 132 is of a diameter slightly larger than the diagonal distance between opposite corners of the square tube 136 to permit the segmental layers 112 to rotate about the square tube. The segmental layers 112a with the square opening 134 cannot so rotate but can only move axially of the tube as the layers 112 are rotated from an overlying aligned posture to offset nested compact intermediate position.

As shown in FIGS. 12 and 18, the first four segmental layers under the top plate 114 are layers 112 with round openings 132 as in FIG. 16. The sixth, eighth and tenth segmental layers under the top plate are layers 112a provided with the square axial opening 134, the fifth, seventh and ninth segmental layers 112 again having the round axis opening 132. The first four segmental layers 112 can and preferably should be maintained in overlying aligned relationship to enable the stack to be manually grasped and more readily held and manipulated by such layers, from a storage to an operative position and back again. If these first segmental layers 112 were alternately rotated into intermediate offset compact relationship with next adjacent segmental layers, it would probably require the use of two hands to grasp, lift and manipulate the compacted adjustable safety die block, whether it be in the form 10 or 100. By leaving a few of the top segmental layers in stacked overlying posture, the aligned lobes provide simple means for grasping and lifting the stack, in effect providing a handle for the die block.

Figure 14:
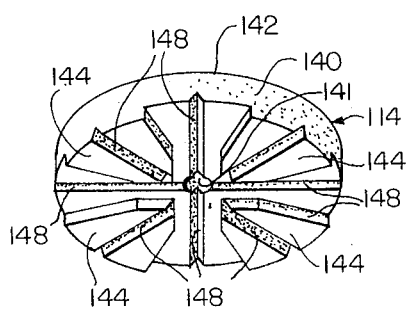
FIGS. 14 and 15 are bottom and top perspective views respectively of the top and bottom plates of the stack of segmental layers illustrated in FIG. 12.
Figure 15:
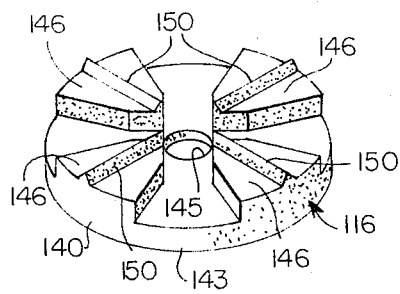

As illustrated in FIGS. 14 and 15, the top plate 114 and the bottom plate 116 each comprises a circular substantially cylindrical body 140 having planar top and bottom surfaces 142 and 143 respectively, a diameter substantially that of the segmental layers 112 and 112a, and round axial openings 141 and 145 respectively therethrough. However, the opposite face of these plates in each instance is provided with axially projecting lobe portions 144 depending from the top plate 114, and lobe portions 146 on the bottom plate 116, the difference being one of axial extent.

Commercial fabrication of the adjustable safety die blocks presently requires that each segmental layer 112 and 112a have an axial thickness or height of 1 inch, excluding the height of the rib 124. The top plate 114 and the bottom plate 116, including their respective lobes, also each have a thickness of 1 inch. However, the lobes 144 under the top plate 114 have an axial length of ¼ inch, while the lobes 146 on the bottom plate 116 have an axial length of ½ inch. When fully stacked in aligned overlying relationship, the segmental layers, the top plate and the bottom plate, as illustrated in FIG. 12, have an overall height of 12 inches. When compactly arranged as shown in FIG. 18, this atack has an overall height of 8¼ inches, a reduction of 3¾ inches. The top plate with its ¼ inch lobes and the bottom plate with its ½ inch lobes permits variable adjustments in increments of ¼ from the compacted 8¼ inch height to the full height of 12 inches.

It will of course be understood that these dimensional references to a commercial product are merely representative of the height variability that can be built into the die blocks 100 formed of these segmental layers and top and bottom plates, making the adjustable safety die block of this invention as flexible as possible for the benefit of press operators, millwrights, and other personnel requiring the safety features of a die block.

The lobes 144 and the body 140 intermediate the lobes on the underside of the top plate 114 are provided with radial grooves 148 adapted to receive and seat the upstanding ribs 124 of the topmost segmental layers 112 in either its fully aligned or its offset posture. The lobes 146 and the body 140 intermediate the lobes on the upper side of the bottom plate 116 are provided with radial ribs 150 adapted to seat in the grooves 128 of the lowermost aligned segmental layer 112a next thereabove or of the lowermost offset segmental layer 112 with which the bottom plate 116 is aligned by its own rotation upon the square tube 136.

The screw and tube assembly 118 is substantially the same as the screw and tube assembly 14 for the adjustable safety die block 10 with some minor exceptions. The square tube 134 instead of round tube 62 is provided with the threaded adapter 64, and locking rings 154, 154 of square section are used in complementary grooves in the square tube 134 to retain the bottom plate 146 thereon. However, the top plate and bottom plate 114 and 116 respectively can be rotated upon relaxation of the screw and tube assembly 118 from close engagment upon the plates. The radial lobes 144 and 146 of the top and bottom plates respectively have substantially the same radial and transverse configuration as that of the lobes 120 of segmental layers 112 and 112a so as to correspond therewith in vertical aligned stacking as well as in rotated offset compacted relationship. Operation of the assembly 118 in compacting the top and bottom plates and the segmental layers of the die block 100 proceeds substantially as described above for the screw and tube assembly 14.

The segmental layers 12, 112 and 112a, and the top and bottom plates 114 and 116 of the adjustable safety die blocks 10 and 100 respectively can be made of machinable or moldable metals such as aluminum alloy 356–T6, magnesium alloys or the like, high in compressive strength. Or, machinable or moldable plastic materials of high compressive strength, such as DuPont's ZYTEL, a nylon material reinforced with short glass fibers, can be used for the various segmental layers and plates disclosed hereinabove.

Although particular embodiments of the invention have been disclosed herein for purposes of explanation, further modifications or variations thereof, after study of this specification, will or may become apparent to those skilled in the art to which the invention pertains. Reference should be had to the appended claims in determining the scope of the invention.

I claim:

1. In an adjustable safety die block, the improved combination comprising
a plurality of segmental layers,
and means securing said segmental layers axially thereof in a parallel series forming a vertical stack, at least some of said segmental layers being rotatable about said securing means for offset relationship to next adjacent segmental layers,
said next adjacent segmental layers being axially aligned and in contiguous load bearing relationship,
said offset segmental layers being axially aligned and in non-load bearing relationship.

2. The structure defined in claim 1, wherein said segmental layers are made of a high compression strength relatively light weight metallic material.

3. The structure defined in claim 2, wherein said metallic material is an aluminum alloy.

4. The structure defined in claim 2, wherein said metallic material is a magnesium alloy.

5. The structure defined in claim 1, wherein said segmental layers are made of a high compression strength relatively light weight plastic material.

6. The structure defined in claim 5, wherein said plastic material is a nylon reinforced with glass fibers.

7. The structure defined in claim 1, wherein
each said segmental layer is formed in a radial lobe design,
   a plurality of lobes projecting radially outwardly from a central web section,
   said web section having an opening axially therethrough for admission of said securing means,
   said lobes being spaced circumferentially apart from each other.

8. The structure defined in claim 7, wherein
said lobes taper outwardly from a narrower width at their proximal ends adjacent said web section to a greater width adjacent their distal ends at the circumference of said layer.

9. The structure defined in claim 8, wherein
said segmental layer is provided with open spaces between said lobes of slightly greater width dimensions than the width dimensions of said lobes, whereby when a first segmental layer is rotated about said axial securing means, the lobes thereof will seat within the open spaces between the lobes of a next adjacent segmental layer and the web section of said first segmental layer will rest upon the web section of said next adjacent segmental layer therebelow.

10. The structure defined in claim 7, wherein
said segmental layers when arranged in stacked overlying aligned relationship form a safety die block of fully extended height,
and when said stack is arranged with some segmental layers in offset relationship, the remaining segmental layers in stacked overlying aligned relationship form a safety die block of reduced height.

11. The structure defined in claim 7, wherein
said lobes are provided with substantially planar top and bottom surfaces lying in common parallel planes.

12. The structure defined in claim 11, wherein
said lobes are provided with complementary means on their top and bottom surfaces to maintain said segmental layers in overlying aligned relationship when arranged in a load bearing stack.

13. The structure defined in claim 11, wherein
said lobes are provided with radially extending ribs on their top surfaces and radially extending complementary, vertically aligned grooves on their bottom surfaces, to maintain said segmental layers in overlying aligned relationship when arranged in a load bearing stack.

14. The structure defined in claim 11, including
top and bottom plates at each end of said stack,
said top and bottom plates each having
   a planar surface at one axial end thereof,
   and a plurality of radial lobes corresponding in number, disposition, and configuration to the lobes of said segmental layers next thereto adjacent, extending axially from the other axial end thereof.

15. The structure defined in claim 14, wherein
the axial thickness of said lobes on said top plate is at variance with the axial thickness of said lobes on said bottom plate,
whereby a greater number of incremental changes in the compacted height of said stack can be effected.

16. The structure defined in claim 14, wherein
the axial thickness of said lobes on said top plate is substantially equal to or less than one-half the thickness of said top plates,
and the axial thickness of said lobes on said bottom plate is substantially equal to or less than one-half the thickness of said bottom plate.

17. The structure defined in claim 14, wherein
the axial thickness and the diameter of each said top and bottom plates are substantially equal respectively to the axial thickness and the diameter of the segmental layers next thereto adjacent.

18. The structure defined in claim 14, wherein
said top plate lobes and the body of said top plate intermediate said lobes are provided on their distal surfaces with radially extending grooves adapted to receive and seat said radial ribs of the next adjacent segmental layer in either a fully aligned overlying relationship or in an offset relationship,
and said bottom plate lobes are provided with radially extending ribs on their distal surfaces adapted to seat in the radial grooves of the next adjacent segmental layer in either a fully aligned relationship or in an offset relationship.

19. The structure defined in claim 7, wherein said lobes are provided with radially extending, transversely convexly curved crowned top surfaces and complementary transversely curved bottom surfaces, to maintain said segmental layers in overlying aligned relationship when arranged in a load bearing stack.

20. The structure defined in claim 7, wherein
said central web section is substantially planar, intermediate and substantially medial of the top and bottom surfaces of said lobes, and of a thickness less than one-half the thickness of said lobes,
whereby when a first segmental layer is rotated about said axial securing means to an offset posture, the central web section thereof will rest upon the central web section of the segmental layer next adjacent therebelow and the lobes of said first offset segmental layer will be free of load bearing contact with the other offset segmental layers in said die block.

21. The structure defined in claim 1, wherein
said securing means provides a common axis for said segmental layers.

22. The structure defined in claim 1, wherein
said segmental layer securing means comprises
   a telescoping screw and tube assembly,
   said assembly securing said segmental layers in their full height aligned overlying stacked relationship, and alternatively in a compacted, partially stacked and partially offset relationship of reduced height,
   the ends of said assembly, securing said segmental layers in either posture, being adjustable within the outer limits of said die block.

23. The structure defined in claim 22, wherein
said screw and tube assembly comprises a screw and a tube,
   said tube having a threaded adapter at its proximal end to threadedly receive and engage said screw therein,
   means securing said tube against axial displacement to at least one segmental layer at its distal end.

24. The structure defined in claim 23, wherein
said tube is cylindrical, and said means securing said tube to said segmental layer comprises a pair of C-rings disposed above and below said segmental layer and affixed to said tube.

25. The structure defined in claim 23, wherein said tube is of rectilinear cross-section,
and said means securing said tube to said segmental layer comprises a pair of rectilinear cross-section C-rings disposed above and below said segmental layer and affixed to said tube.

26. The structure defined in claim 25, wherein
selected segmental layers, arranged alternately with next adjacent segmental layers, are provided with axial openings of rectilinear cross-section closely encompassing said tube to prevent rotation of said selected segmental layers and allow movement thereof only axially of said tube.

27. The structure defined in claim 25, wherein
said some segmental layers are provided with cylindrical axial openings closely encompassing said screw or said tube to allow rotation of said some segmental layers thereabout,
and other of said segmental layers are provided with axial openings of rectilinear cross-section closely encompassing said tube to prevent rotation of said other segmental layers and allow movement thereof only axially of said tube.

28. The structure defined in claim 1, wherein
the axial thickness of each said segmental layer is substantially the same,
and the diameter of each said segmental layer is substantially the same.

* * * * *